E. BALDWIN.

Improvement in Flower-Pots.

No. 129,451. Patented July 16, 1872.

Witnesses:
J. C. Brecht.
L. H. Trook

Inventor:
Edward Baldwin
By his attorney
Chas. F. Stansbury 129,451

UNITED STATES PATENT OFFICE.

EDWARD BALDWIN, OF WASHINGTON, DISTRICT OF COLUMBIA.

IMPROVEMENT IN FLOWER-POTS.

Specification forming part of Letters Patent No. 129,451, dated July 16, 1872.

SPECIFICATION.

*To all whom it may concern:*

Be it known that I, EDWARD BALDWIN, of the city of Washington, in the District of Columbia, have invented an Improved Flower-Pot; and I do hereby declare the following to be a full and correct description of the same, reference being had to the accompanying drawing, in which—

Figure 1:
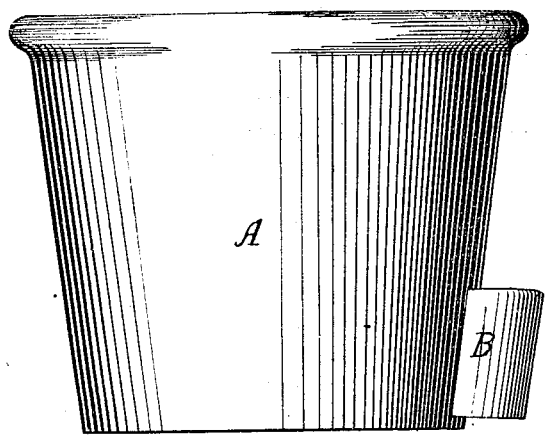
Figure 2:
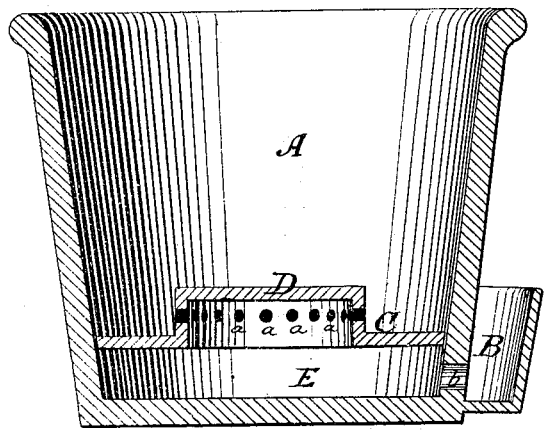

Figure 1 is a side view of my improved flower-pot. Fig. 2 is a vertical section of the same.

The same letter marks the same part in both figures.

The nature of my invention consists in providing the ordinary flower-pot with a hat-shaped perforated disk, which is used to support the earth at some distance above the bottom of the pot, and connecting the chamber thus left below said disk with an external cup through which water can be introduced into said chamber, all as hereinafter set forth.

The construction will be apparent upon inspection of the drawing, in which A marks the body of the flower-pot; B, the external cup; C, the hat-shaped disk, with its crown-like projection D provided with the lateral perforations *a a a*. E is the lower chamber, connected by a perforation, *b*, with the lower part of the cup B.

The disk C being in place, the earth for the reception of the plant is introduced into the space above it. Water is poured into the cup B until it stands level with the bottom of the disk C. The vapor arising from the evaporation of this water will pass through the holes *a a a* and keep the earth constantly in the proper state of moisture to promote the growth of the plant in the pot. Owing to the location and direction of the holes *a a a*, there will be no tendency of the earth to escape through them into the chamber E, and the open cup B will permit the height of the water in the chamber to be ascertained by inspection. The height of the cup should be such that the water can never rise above the line of perforation *a a a*, so that no washing of the earth can take place by the mingling of the water with it.

Having thus fully described my invention, what I claim, and desire to secure by Letters Patent, is—

The hat-shaped disk C, made as described, and having the perforations *a a*, adapted for use in a flower-pot having the external cup B connected, by a perforation, *b*, with the chamber E, all arranged in the manner and for the purpose set forth.

The above specification of my said invention signed and witnessed at Washington, D. C., this 2d day of May, A. D. 1872.

EDWARD BALDWIN.

Witnesses:
 DANIEL KOLB,
 J. P. WOODNUTT.